(12) United States Patent
Kimura et al.

(10) Patent No.: US 11,258,925 B2
(45) Date of Patent: Feb. 22, 2022

(54) INFORMATION PROCESSING APPARATUS FOR DISPLAYING THE CORRECTION OF AN IMAGE AND NON-TRANSITORY COMPUTER READABLE MEDIUM

(71) Applicant: FUJIFILM BUSINESS INNOVATION CORP., Tokyo (JP)

(72) Inventors: Shunichi Kimura, Kanagawa (JP); Masanori Sekino, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/002,902

(22) Filed: Aug. 26, 2020

(65) Prior Publication Data

US 2021/0306518 A1 Sep. 30, 2021

(30) Foreign Application Priority Data

Mar. 24, 2020 (JP) .............................. JP2020-053193

(51) Int. Cl.
*H04N 1/00* (2006.01)
*H04N 1/387* (2006.01)
*G06T 7/33* (2017.01)

(52) U.S. Cl.
CPC ........... *H04N 1/3878* (2013.01); *G06T 7/337* (2017.01); *H04N 1/00718* (2013.01); *H04N 1/00737* (2013.01)

(58) Field of Classification Search
CPC ............. H04N 1/3878; H04N 1/00718; H04N 1/00737; G06T 7/337

USPC .......................................................... 382/289
See application file for complete search history.

(56) References Cited

U.S. PATENT DOCUMENTS

| | | | |
|---|---|---|---|
| 6,711,293 B1 | 3/2004 | Lowe | |
| 2009/0245692 A1* | 10/2009 | Okutomi | G06T 7/32 382/294 |
| 2018/0176409 A1* | 6/2018 | Smith | H04N 1/00809 |
| 2019/0035197 A1* | 1/2019 | Hatton | G06K 9/6211 |
| 2019/0129931 A1* | 5/2019 | Hegde | G06Q 40/06 |

FOREIGN PATENT DOCUMENTS

| | | |
|---|---|---|
| JP | H5-40853 A | 2/1993 |
| JP | 2006-129311 A | 5/2006 |

* cited by examiner

*Primary Examiner* — Gabriel I Garcia
(74) *Attorney, Agent, or Firm* — Oliff PLC (57) ABSTRACT

An information processing apparatus includes a receiver that receives an input image to be recognized and a processor configured to, by executing a program, align the input image with a template image in such a way as to match a recognition area of the input image and a recognition area defined on the template image, perform a process for recognizing the recognition area of the aligned input image, generate a check image including the template image and the aligned input image, and display the check image and a result of the process for recognizing the recognition area of the aligned input image such that a correspondence between the check image and the result is recognizable.

20 Claims, 7 Drawing Sheets

INFORMATION PROCESSING APPARATUS FOR DISPLAYING THE CORRECTION OF AN IMAGE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-053193 filed Mar. 24, 2020.

BACKGROUND

(i) Technical Field

The present disclosure relates to an information processing apparatus and a non-transitory computer readable medium.

(ii) Related Art

Techniques for automatically recognizing characters on a form or the like have been proposed.

In Japanese Unexamined Patent Application Publication No. 2006-129311, an alignment apparatus that can easily align a standard document with a small amount of calculation is described. The alignment apparatus includes image rotation means for rotating an input image to an upright position and holding a rotation angle used in a process for rotating the input image and deviation correction means for calculating deviation of the input image in accordance with the rotation angle or information regarding an input device and performing correction on the basis of the deviation.

SUMMARY

When characters are recognized on an input image such as a form, the input image and a result of the recognition may both be displayed, and a user may compare the input image and the result of the recognition with each other and correct the result of the recognition as necessary.

When an input image is skewed and displayed as it is, however, the user might feel uncomfortable. Although it is possible to correct the skew of the input image and then display the input image, some information might be lost as a result of the correction of the skew and not displayed. More specifically, when a recognition area is defined on a template image, the recognition area of the template image and a recognition area of an input image are aligned with each other, and only the recognition area of the template image is displayed, information outside the recognition area of the template image, especially information relating to checking of a result of recognition, might be lost and not displayed.

Aspects of non-limiting embodiments of the present disclosure relate to provision of a technique for, when a recognition area of an input image is defined on a template image and characters are recognized with a recognition area of the template image and the recognition area of the input image aligned with each other, preventing lost information and enabling a user to easily compare the input image and a result of the recognition with each other.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a receiver that receives an input image to be recognized and a processor configured to, by executing a program, align the input image with a template image in such a way as to match a recognition area of the input image and a recognition area defined on the template image, perform a process for recognizing the recognition area of the aligned input image, generate a check image including the template image and the aligned input image, and display the check image and a result of the process for recognizing the recognition area of the aligned input image such that a correspondence between the check image and the result is recognizable.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described hereinafter with reference to the drawings.

Basic Principle

First, the basic principle of the present exemplary embodiment will be described.

In an information processing apparatus according to the present exemplary embodiment, when an image such as a form is input and characters on the form or the like are recognized, a recognition area of the input image is defined on a template image, and the characters are recognized with a recognition area of the template image and the recognition area of the input image aligned with each other. A "template image" herein refers to a fixed form that defines a recognition target on an input image and includes a recognition area and a recognition method. More specifically, a template image specifies, for example, "recognize characters at XX positions with a romaji dictionary". The recognition area can be defined with, for example, coordinates of vertices of a rectangular area or coordinates of an upper-left vertex and the size of a rectangular area.

Characters are then recognized with a recognition area of a template image and a recognition area of an input image aligned with each other, and both the input image and a result of the recognition are displayed on a display device or the like to enable a user to check the result of the recognition.

Figure 1:
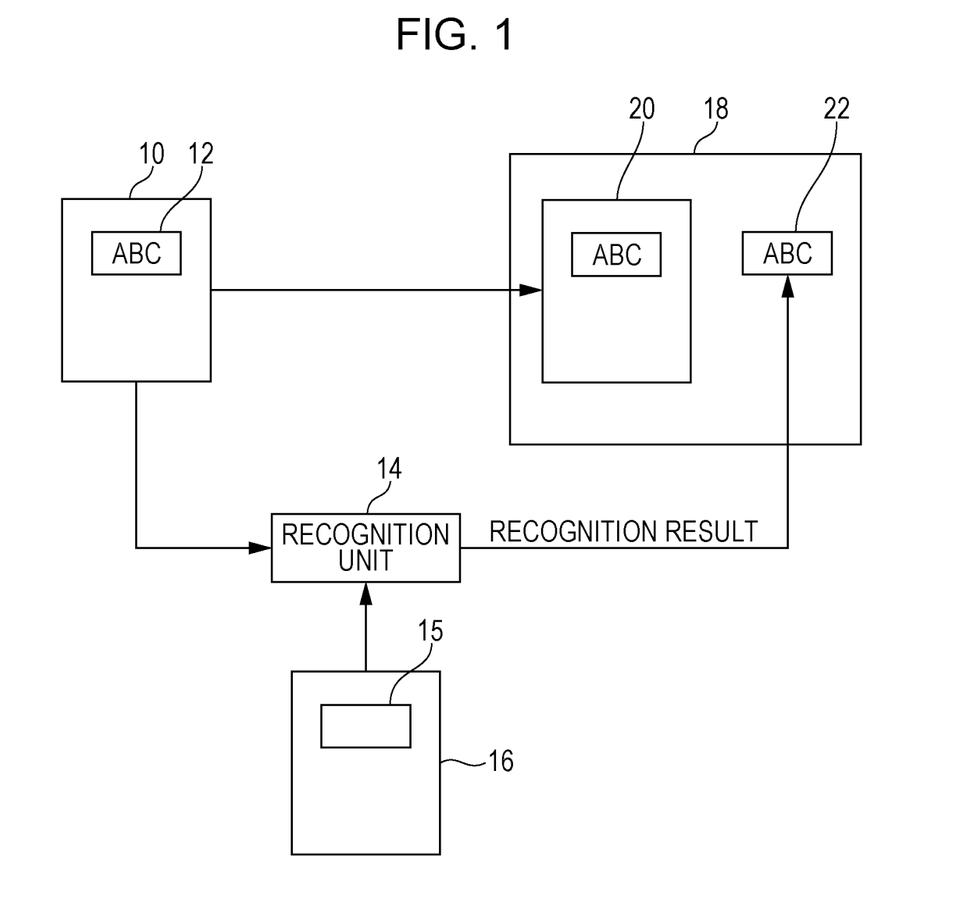
FIG. 1 is a schematic diagram illustrating a configuration according to an exemplary embodiment.

FIG. 1 is a schematic diagram illustrating a configuration according to the present exemplary embodiment.

An input image 10 such as a form includes a recognition area 12 to be recognized. In FIG. 1, the recognition area 12 includes characters "ABC". The input image 10 is supplied to a recognition unit 14.

A template image 16 that defines a recognition area and a recognition method is prepared in advance and supplied to the recognition unit 14. The recognition area defined by the template image 16 is represented as an area (recognition area) 15 in FIG. 1.

The recognition unit 14 recognizes characters while aligning the recognition area 15 of the template image 16 and the recognition area 12 of the input image 10 with each other. "Alignment" herein refers to alignment of a position of an input image with a position of a template image, and a known alignment technique may be used. More specifically, for example, feature points on an input image and feature points on a template image may be extracted, pairs of the feature points on the input image and the corresponding feature points on the template image may be created, and a transformation matrix for transforming coordinates on the input image into coordinates on the template image may be calculated using the pairs of the feature points.

The recognition unit 14 recognizes the recognition area 12 of the input image 10 using the template image 16 and displays a result 22 of the recognition in a check screen 18. The recognition unit 14 also displays the input image 10 in the check screen 18. The user can easily check the result 22 by looking at an input image 20 and the result 22 displayed in the check screen 18 side-by-side.

Figure 2:
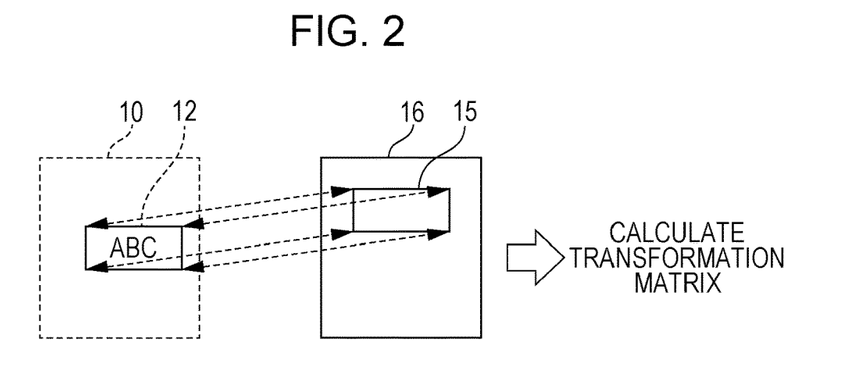
FIG. 2 is a diagram illustrating calculation of a transformation matrix according to the exemplary embodiment.

FIG. 2 schematically illustrates alignment between the input image 10 and the template image 16. Pairs of feature points on the recognition area 12 of the input image 10 and feature points on the recognition area 15 defined on the template image 16 are created, and a transformation matrix for transforming coordinates on the input image 10 into coordinates on the template image 16 using the pairs of the feature points is calculated. The transformation matrix is an Affine transformation matrix or a projective transformation matrix. The transformation matrix is then applied to the input image 10 to align the position of the input image 10 with the position of the template image 16, and the characters in the recognition area 12 of the input image 10 are recognized.

Figure 3:
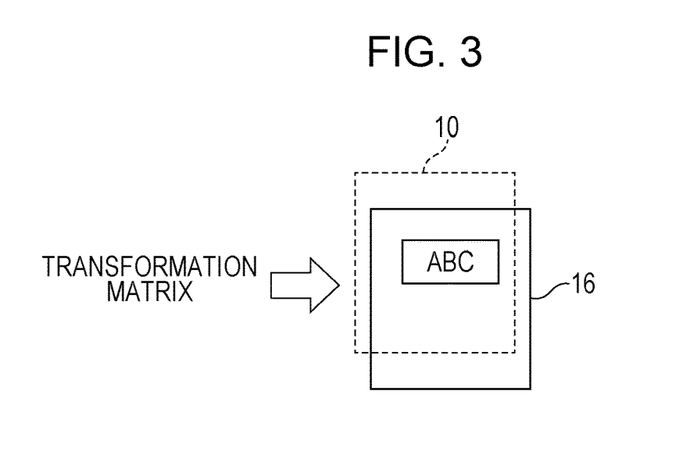
FIG. 3 is a first diagram illustrating alignment according to the exemplary embodiment.

FIG. 3 schematically illustrates alignment of the position of the input image 10 with the position of the template image 16 using a transformation matrix. The input image 10 is translated such that the recognition area 12 of the input image 10 is aligned with the recognition area 15 of the template image 16. As a result, the characters "ABC" in the recognition area 12 can be correctly recognized.

When the input image 10 is skewed, the input image 10 may be basically rotated to correct the skew and then aligned with the template image 16. The user might feel uncomfortable, however, if the input image 10 is simply rotated.

More specifically, when the input image 10 is skewed by mistake in scanning of a form or the like, the result 22 displayed in the check screen 18 is also skewed. The user feels uncomfortable, and it is difficult to check and correct the result 22 compared to when the result 22 is upright.

The result 22 may be displayed in the check screen 18 in a state in which the result 22 is aligned with the template image 16, that is, in an upright state, after rotating the input image 10, correcting the skew, aligning the input image 10 with the template image 16, and recognizing characters. In this case, however, another problem can arise.

Figure 4:
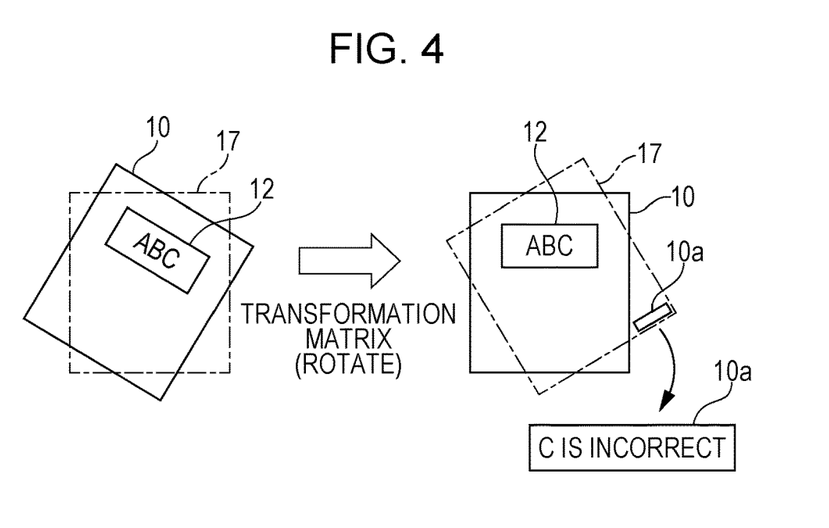
FIG. 4 is a second diagram illustrating the alignment according to the exemplary embodiment.

FIG. 4 schematically illustrates a case where the input image 10 is aligned with the template image 16 and displayed upright by rotating the input image 10 and correcting the skew. A scanning area 17 for the input image 10 is indicated by a dash-dot line. The input image 10 has been corrected to an upright state by rotating the input image 10 using a transformation matrix and aligning the input image 10 with the template image 16. Although the recognition area 12 of the input image 10 is upright, the scanning area 17 and the template image 16 do not completely overlap with each other. When only a part of the input image 10 overlapping with the template image 16 is displayed upright with the input image 10 aligned with the template image 16, therefore, other parts of the input image 10 that have been scanned but that do not overlap with the template image 16 are not displayed. When these parts do not relate to the recognition area 12, the result 22 is not affected, but when these parts include information relating to the recognition area 12, that is, more specifically, information relating to the characters in the recognition area 12, the result 22 is greatly affected when checked and corrected. As illustrated in FIG. 4, for example, when a protruded part 10a includes information relating to the characters in the recognition area 12, such as "C is incorrect", it is difficult for the user to appropriately check and correct the result 22 since the information is lost.

When the input image 10 is skewed by mistake in scanning of a form or the like and a part of the input image 10 is lost, another problem can arise.

Figure 5:
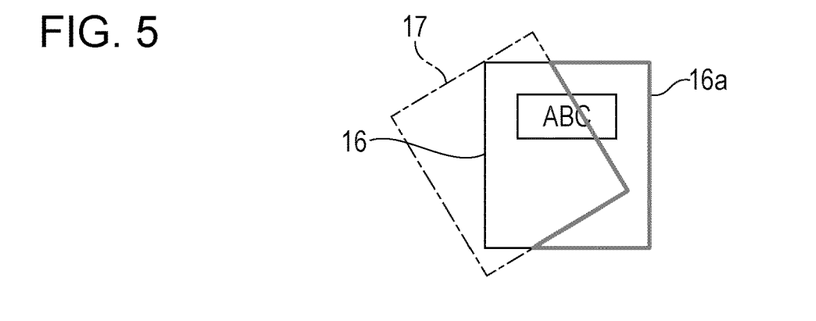
FIG. 5 is a diagram illustrating a circumscribed rectangle of an aligned input image according to the exemplary embodiment.

FIG. 5 schematically illustrates this case. Even when the input image 10 is rotated, aligned with the template image 16, and corrected to an upright state using a transformation matrix, a part 16a lost in scanning is not displayed. Since information to be input as data on the basis of the result 22, that is, information regarding the entirety of the template image 16, is not displayed, the user might feel uncomfortable (discomfort due to a non-rectangular area that should have been displayed as a rectangular area).

In the present exemplary embodiment, therefore, a result of transformation of the input image 10 based on a transformation matrix and the template image 16 are overlapped with each other, a circumscribed rectangular area that is circumscribed on an overlap area is set, and the circumscribed rectangular area is displayed on the check screen 18, in order to reduce discomfort that can be caused when information relating to the recognition area 12 is lost or when a part lost in scanning has not been displayed after the input image 10 is simply rotated and aligned with the template image 16.

Figure 6:
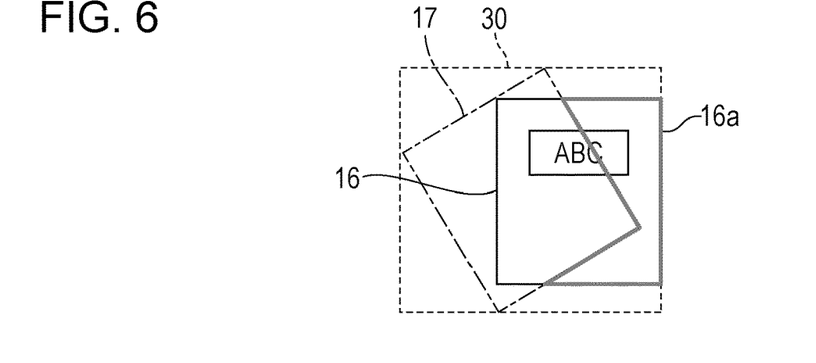
FIG. 6 is a diagram illustrating a circumscribed rectangle of the aligned input image and a template image according to the exemplary embodiment.

FIG. 6 illustrates a circumscribed rectangular area 30 that is circumscribed on an area in which a result of transformation of the input image 10 and the template image 16 overlap with each other. The circumscribed rectangular area 30 is displayed in the check screen 18 illustrated in FIG. 1 as the input image 20. The circumscribed rectangular area 30 includes a protruded part outside the template image 16 and also includes a part 16a missing in scanning. By displaying the circumscribed rectangular area 30 as the input image 20, therefore, the user can visually check information relating to the recognition area 12, which reduces discomfort.

Figure 7:
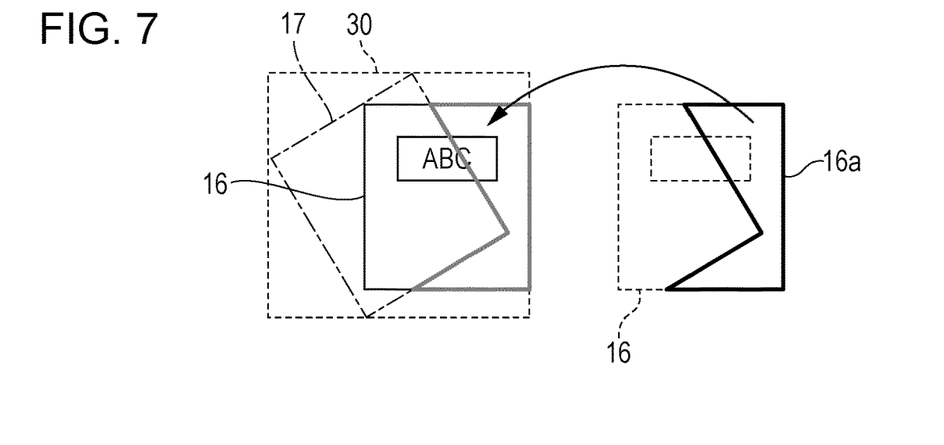
FIG. 7 is a diagram illustrating a complemented template image according to the exemplary embodiment.

Since the part 16a missing in the scanning illustrated in FIG. 6 has not been scanned, image information does not exist, and even when the circumscribed rectangular area 30 is displayed in the check screen 18, the part 16a is displayed as a blank. A part of the template image 16 corresponding to the part 16a, therefore, may be cut off and displayed as the part 16a of the template image 16 as illustrated in FIG. 7 instead of displaying the part 16a as a blank. In this case, the part 16a is displayed as a part of the template image 16, not as a blank, which further reduces discomfort of the user.

Here, the part 16a may be displayed in a certain color in order to emphasize that the part 16a is a part of the template image 16. The certain color is, for example, pale gray or pale blue.

Next, the present exemplary embodiment will be described more specifically.

Configuration

Figure 8:
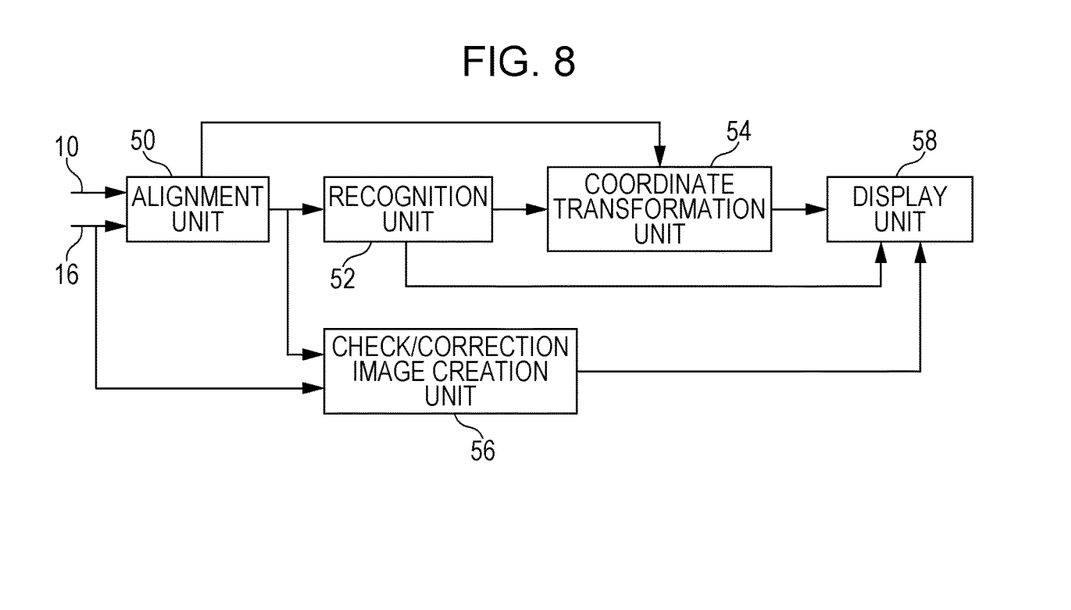
FIG. 8 is a diagram illustrating functional blocks according to the exemplary embodiment.

FIG. 8 is a diagram illustrating functional blocks of the information processing apparatus according to the present exemplary embodiment. The information processing apparatus includes an alignment unit 50, a recognition unit 52, a coordinate transformation unit 54, a check/correction image creation unit 56, and a display unit 58.

The alignment unit 50 receives an input image 10 and a template image 16 and aligns the input image 10 with the template image 16 using a transformation matrix. The alignment unit 50 creates the transformation matrix from the input image 10 and the template image 16 and aligns the input image 10 with the template image 16 using the created transformation matrix. That is, the alignment unit 50 extracts feature points on the input image 10 and the template image 16, creates pairs of the feature points on the input image 10 and the corresponding feature points on the template image 16, and calculates the transformation matrix using the pairs of the feature points. The alignment may be regarded as a process for transforming a coordinate system of the input image 10 into a coordinate system of the template image 16. In U.S. Pat. No. 6,711,293, a technique for aligning the input image 10 with the template image 16 through a projective transformation is described, and this technique may be used. When aligning the input image 10 with the template image 16, the alignment unit 50 also calculates the amount of shift from the coordinate system of the template image 16 to a coordinate system of a check/correction image. The alignment unit 50 outputs the input image 10 transformed in accordance with the coordinate system of the template image 16 to the recognition unit 52. The alignment unit 50 also outputs the amount of shift from the coordinate system of the template image 16 to the coordinate system of the check/correction image to the coordinate transformation unit 54.

The recognition unit 52 performs character recognition on the input image 10 received from the alignment unit 50 using the recognition area and the recognition method defined by the template image 16. The recognition area is given as character frame coordinates in the coordinate system of the template image 16. When the recognition method is "recognize with a romaji dictionary", for example, characters are recognized as romaji (alphabet) using the romaji dictionary. The recognition unit 52 outputs the character frame coordinates to the coordinate transformation unit 54 and a result (text data) of the recognition to the display unit 58.

The coordinate transformation unit 54 transforms the character frame coordinates (the character frame coordinates of the template image 16) received from the recognition unit 52 into ones in the coordinate system of the check/correction image using the amount of shift from the coordinate system of the template image 16 to the coordinate system of the check/correction image calculated by the alignment unit 50 and outputs the character frame coordinates in the coordinate system of the check/correction image to the display unit 58. A character frame is a frame of the recognition area 15 defined by the template image 16, and the character frame coordinates are coordinates of a position of the frame.

The check/correction image creation unit 56 creates the check/correction image using the input image 10 received from the alignment unit 50 and the template image 16. That is, the check/correction image creation unit 56 overlaps the input image 10 and the template image 16 aligned by the alignment unit 50 with each other and creates a circumscribed rectangular area of an area in which the input image 10 and the template image 16 overlap with each other as a check/correction image. The check/correction image corresponds to the input image 20 illustrated in FIG. 1. As illustrated in FIG. 7, the check/correction image creation unit 56 fills the lost part 16a with a part of the template image 16 as necessary. Techniques for filling a part of an image with another image or synthesizing an image with another image are known. The check/correction image creation unit 56 outputs the created check/correction image to the display unit 58.

The display unit 58 corresponds to the check screen 18 illustrated in FIG. 1 and displays the result of recognition received from the recognition unit 52, the character frame coordinates received from the coordinate transformation unit 54, and the check/correction image received from the check/correction image creation unit 56.

Figure 9:
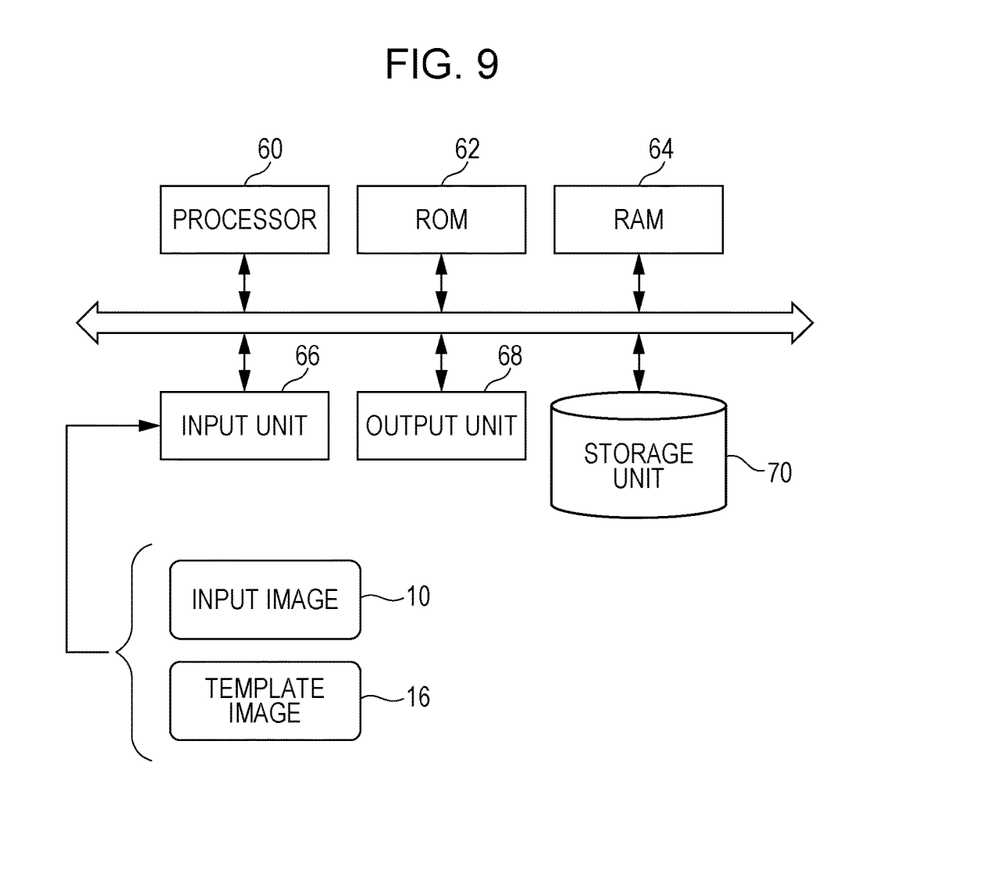
FIG. 9 is a block diagram illustrating a configuration according to the exemplary embodiment.

FIG. 9 is a block diagram illustrating the configuration of the information processing apparatus according to the present exemplary embodiment. The information processing apparatus is achieved by a computer and includes a processor 60, a read-only memory (ROM) 62, a random-access memory (RAM) 64, an input unit 66, an output unit 68, and a storage unit 70.

The processor 60 reads a processing program stored in the ROM 62 or another program memory and executes the processing program using the RAM 64 as a working memory to achieve the alignment unit 50, the recognition unit 52, the coordinate transformation unit 54, and the check/correction image creation unit 56. Processes performed by the processor 60 are as follows.

A process for calculating a transformation matrix

A process for aligning the input image 10 using a transformation matrix

A process for recognizing the input image 10

A process for transforming character frame coordinates

A process for creating a check/correction image

A process for displaying a check/correction image, a result of recognition, and character frame coordinates The processor 60 is a processor in a broad sense. Examples of the processor 60 include general processors (e.g., CPUs) and dedicated processors (e.g., graphics processing units (GPUs), and application-specific integrated circuits (ASICs), field-programmable gate arrays (FPGAs), and programmable logic devices). An operation achieved by the processor 60 may be achieved by one processor or plural processors that are located physically apart from each other but that work cooperatively.

The input unit 66 includes a keyboard, a mouse, a scanner, a touch panel, and a communication interface and receives an input image 10 such as a form and a template image 16. The template image 16 may be included in a program or stored in the storage unit 70. The user check a result of recognition on a check/correction image and, if correction is required, operates the input unit 66 to correct the result of recognition.

The output unit 68 is achieved by a display device including a touch panel or the like and displays a check/correction image, a result of recognition, and a character frame created by the processor 60. The output unit 68 achieves the display unit 58 illustrated in FIG. 8. Alternatively, the output unit 68 may be achieved by a communication interface, and a check/correction image, a result of recognition, and a character frame may be output to and displayed on an external display device via the Internet. As a result, the user can check and correct the result of recognition on a screen of a tablet terminal, a personal computer (PC), or the like at a position away from the information processing apparatus.

The storage unit 70 stores input images 10, template images 16, results of recognition, corrected results of recognition, and the like.

Flowchart

Figure 10:
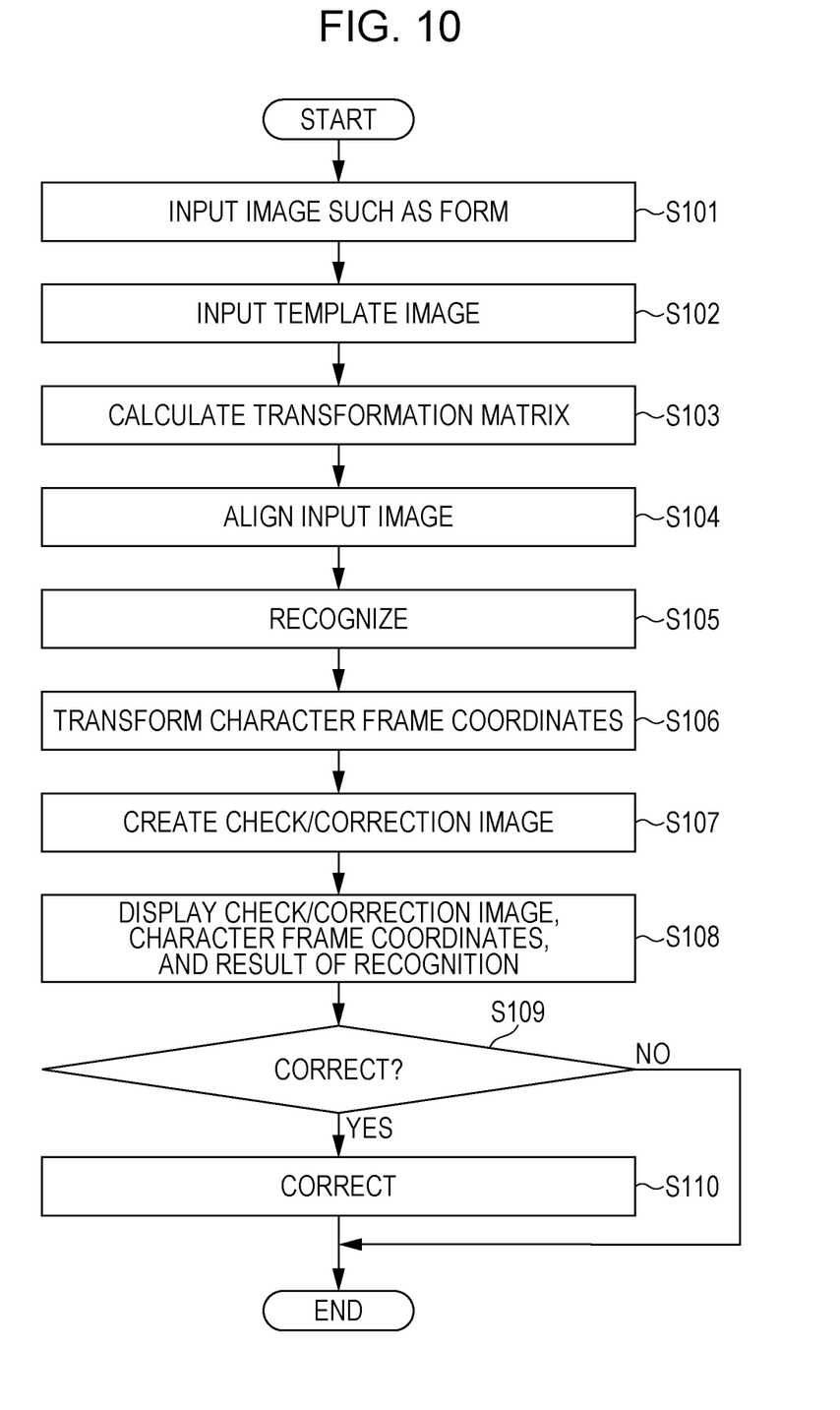
FIG. 10 is a flowchart illustrating a process according to the exemplary embodiment.

FIG. 10 is a flowchart illustrating a process according to the present exemplary embodiment.

The processor 60 receives a document to be recognized, such as a form, as an input image 10 (S101). More specifically, for example, the processor 60 scans a form set in an automatic document feeder (ADF) and receives digital image data. Plural scanners may perform the scanning. Alternatively, the processor 60 may read, from the storage unit 70, digital image data obtained by a scanner in advance and stored in the storage unit 70. The user may specify digital image data to be recognized using the keyboard or the like.

Next, the processor 60 receives a template image 16 (S102). The template image 16 is prepared for each input image 10. When the input image 10 is a form, a format of the form is known, and a template image 16 suitable for positions of text fields to be recognized and a type of character is prepared. The processor 60 may identify a type of input image 10 and select a template image 16 suitable for the identified type, instead. Alternatively, the user may manually select a template image 16. The template image 16 is incorporated into a program or stored in the storage unit 70. The processor 60 reads the template image 16 at a certain timing after receiving the input image 10.

Next, the processor 60 calculates a transformation matrix for aligning the input image 10 with the template image 16 from the input image 10 and the template image 16 (S103). The processor 60 creates pairs of feature points on a recognition area 12 of the input image 10 and feature points on a recognition area 15 defined on the template image 16 and calculates the transformation matrix using the pairs of the feature points. The transformation matrix is an Affine transformation matrix or a projective transformation matrix, but is not limited to these. The processor 60 may measure how much the input image 10 and the template image 16 are deviated from each other and, if the amount of deviation is smaller than a predetermined threshold, skip the process for calculating a transformation matrix while determining that there would be no problem in performing a recognition process. When a transformation matrix has already been calculated and stored in the storage unit 70 or the like and can be used for the alignment between the input image 10 and the template image 16, the processor 60 may skip the process for calculating a transformation matrix.

Next, the processor 60 aligns the input image 10 with the template image 16 using the transformation matrix (S104). As a result, a position of the recognition area 12 of the input image 10 and a position of the recognition area 15 of the template image 16 are aligned with each other. The positions may be substantially aligned with each other so that a certain level of recognition accuracy is secured, and need not be perfectly aligned with each other.

Next, the processor 60 recognizes characters in the recognition area 12 of the aligned input image 10 in accordance with the recognition area 15 and the recognition method defined by the template image 16 (S105). A known technique may be used for a process for recognizing characters. A method described in Japanese Unexamined Patent Application Publication No. 5-40853, for example, may be used, but another method may be used, instead. Although romaji recognition employing a romaji dictionary is taken as an example in the present exemplary embodiment, character recognition of numbers, hiragana, katakana, kanji, or another type of character may of course be performed, instead. The processor 60 transforms character frame coordinates (S106). That is, the processor 60 transforms character frame coordinates (if the recognition area 15 is rectangular, the character frame coordinates are coordinates of positions of four vertices or coordinates of a position of an upper-left vertex and the length of two sides orthogonal to each other) corresponding to the recognition area 15 defined by the template image 16 into a coordinate system of a check/correction image (S106). The transformation will be described in detail later.

Next, the processor 60 creates a check/correction image (S107). The processor 60 creates the check/correction image from the aligned input image 10 and the template image 16. The processor 60 overlaps the aligned input image 10 and the template image 16 with each other and creates the check/correction image as a circumscribed rectangle of an area in which the input image 10 and the template image 16 overlap with each other. The circumscribed rectangular area 30 illustrated in FIG. 6 corresponds to the check/correction image.

Next, the processor 60 outputs the check/correction image created in S107, the transformed character frame coordinates created in S106, and the result of recognition obtained in S105 to the output unit 68 to display the check/correction image, the transformed character frame coordinates, and the result of recognition (S108). Any display mode may be used, but the check/correction image and the result of recognition may be desirably displayed such that a correspondence between the check/correction image and the result of recognition is recognizable. For example, the check/correction image and the character frame coordinates overlapping the check/correction image are displayed in a left part of a screen, and the result of recognition is displayed in a right part of the screen in such a way as to facilitate comparison. A label "input image" may be attached to the check/correction image, and a label "result of recognition of input image" may be attached to the result of recognition. Alternatively, a sign such as an arrow may be provided between the check/correction image and the result of recognition. The check/correction image may be displayed in an upper part of the screen, and the result of recognition may be displayed in a lower part of the screen, instead. Alternatively, the result of recognition may be displayed when the user clicks on the check/correction image. Since the check/correction image includes the entirety of the scanned input image 10, information relating to the recognition area 12 that can be included in the input image 10 can be securely displayed, and the user can refer to the information. In addition, since the check/correction image is rectangular, the user can compare the check/correction image and the result of recognition with each other without feeling uncomfortable.

Next, the processor 60 determines whether to correct the result of recognition (S109). More specifically, the user visually checks the check/correction image and, if the check/correction image needs to be corrected (YES in S109), inputs a correction instruction using the input unit 66. The processor 60 corrects the result of recognition in accordance with the correction instruction from the user (S110). If the result of recognition is "ABC" but the user determines that correct characters are "ABD", for example, the user inputs an instruction to correct "C" to "D" using the input unit 66. The processor 60 corrects the result of recognition to "ABD" in accordance with the instruction and displays the corrected result of recognition.

After the user completes the check and the correction, the processor 60 stores the result of recognition in the storage unit 70 in accordance with an instruction from the user. Alternatively, the processor 60 outputs the result of recognition to another computer (e.g., a service computer) through the output unit 68.

Figure 11A:
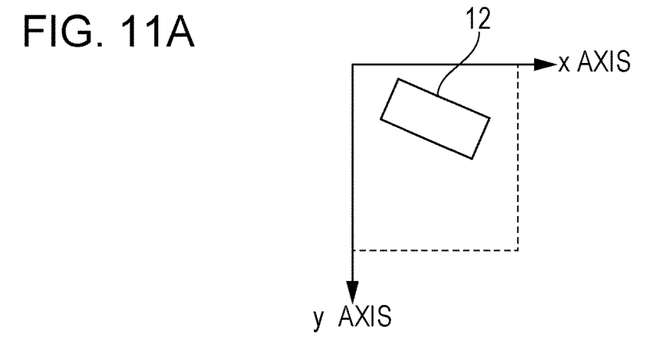
FIG. 11A is a diagram illustrating a coordinate system of an input image according to the exemplary embodiment.
Figure 11B:
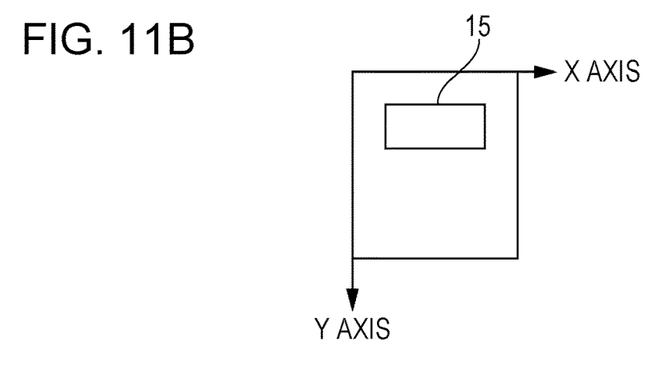
FIG. 11B is a diagram illustrating a coordinate system of a template image according to the exemplary embodiment.
Figure 11C:
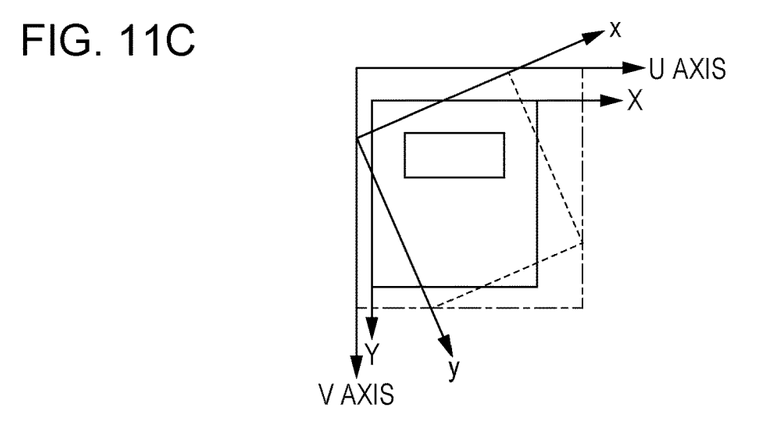
FIG. 11C is a diagram illustrating a coordinate system of a check/correction image according to the exemplary embodiment.

FIGS. 11A to 11C schematically illustrate a process for transforming a coordinate system performed by the processor 60.

FIG. 11A illustrates a coordinate system of an input image 10. The coordinate system of the input image 10 is defined as an xy coordinate system whose origin is an upper-left vertex of the input image 10, whose x-axis extends from the origin along an upper side of a circumscribed rectangle of the input image 10, and whose y-axis extends from the origin along a left side of the circumscribed rectangle. When the input image 10 is skewed, a recognition area 12 of the input image 10 is accordingly skewed.

FIG. 11B illustrates a coordinate system of a template image 16. The coordinate system of the template image 16 is defined as an XY coordinate system whose origin is an upper-left vertex of the template image 16, whose X-axis extends from the origin along an upper side of the template image 16, and whose Y-axis extends from the origin along a left side of the template image 16. A recognition area 15 of the template image 16 is upright. A frame of the recognition area 15 is a character frame, and coordinates of the character frame are character frame coordinates.

In S104 illustrated in FIG. 10, the input image 10 is aligned with the template image 16. That is, the xy coordinate system, which is the coordinate system of the input image 10, is transformed into the XY coordinate system, which is the coordinate system of the template image 16. As a result, the input image 10 is disposed on the XY coordinate system of the template image 16.

In S107 illustrated in FIG. 10, a circumscribed rectangle of an area in which the input image 10 and the template image 16 on the XY coordinate system of the template image 16 overlap with each other is set. A UV coordinate system whose origin is an upper-left vertex of the circumscribed rectangle and that is parallel to the XY coordinate system of the template image 16 is assumed. That is, a U-axis and a V-axis are parallel to the X-axis and the Y-axis, respectively. The UV coordinate system is a coordinate system of a check/correction image.

FIG. 11C illustrates the UV coordinate system of the check/correction image. Since the character frame coordinates illustrated in FIG. 11B are coordinates of a position on the XY coordinate system of the template image 16, the character frame coordinates need to be transformed from those on the XY coordinate system into those on the UV coordinate system. Since, as described above, the U- and V-axes are parallel to the X- and Y-axis, respectively, the transformation from the XY coordinate system into the UV coordinate system is simple translation and given as the amount of shift. In S106 illustrated in FIG. 10, the amount of shift is calculated in order to transform the character frame coordinates.

In the present exemplary embodiment, an input image 10 and a template image 16 are thus aligned with each other, a circumscribed rectangular area of an image obtained by overlapping the aligned input image 10 over the template image 16 is generated as a check/correction image, character frame coordinates are generated, and the check/correction image, the character frame coordinates, and a result of recognition are displayed on the check screen 18. As a result, an undistorted (unrotated) image can be displayed, and related information provided at an end of the input image 10 or the like can be displayed. Furthermore, when a rectangular check/correction image is used, discomfort of the user can be reduced.

First Modification

Although the recognition unit 52 recognizes characters on an input image 10 aligned by the alignment unit 50 in the above exemplary embodiment, the input image 10 aligned by the alignment unit 50 is supplied to the check/correction image creation unit 56, and the check/correction image creation unit 56 creates a check/correction image. The recognition unit 52, therefore, may recognize characters using the check/correction image.

Figure 12:
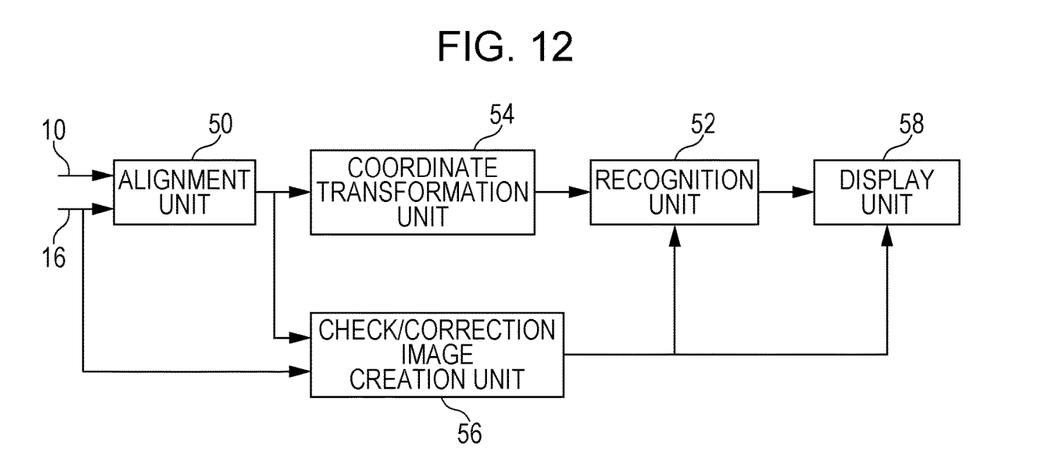
FIG. 12 is a diagram illustrating functional blocks according to a modification.

FIG. 12 is a diagram illustrating functional blocks of an information processing apparatus according to a modification.

The alignment unit 50 receives an input image 10 and a template image 16 and aligns the input image 10 with the template image 16 using a transformation matrix. The alignment unit 50 creates a transformation matrix from the input image 10 and the template image 16 and aligns the input image 10 with the template image 16 using the created transformation matrix. The alignment can be regarded as a process for transforming a coordinate system of the input image 10 into a coordinate system of the template image 16. When aligning the input image 10 with the template image 16, the alignment unit 50 also calculates the amount of shift from the coordinate system of the template image 16 to a coordinate system of a check/correction image.

The alignment unit 50 outputs the input image 10 transformed in accordance with the coordinate system of the template image 16 to the check/correction image creation unit 56. The alignment unit 50 also outputs the amount of shift from the coordinate system of the template image 16 into the coordinate system of the check/correction image to the coordinate transformation unit 54.

The coordinate transformation unit 54 transforms character frame coordinates (character frame coordinates of the template image 16) into ones in the coordinate system of the check/correction image using the amount of shift from the coordinate system of the template image 16 to the coordinate system of the check/correction image calculated by the alignment unit 50 and outputs the character frame coordinates to the recognition unit 52.

The check/correction image creation unit 56 creates the check/correction image using the input image 10 received from the alignment unit 50 and the template image 16. That is, the check/correction image creation unit 56 overlaps the input image 10 aligned by the alignment unit 50 and the template image 16 with each other and creates a circumscribed rectangular area of an overlap area as the check/correction image. The check/correction image creation unit 56 also performs a process for filling a missing part 16*a* with a part of the template image 16 as necessary as illustrated in FIG. 7. The check/correction image creation unit 56 outputs the created check/correction image to the recognition unit 52 and the display unit 58.

The recognition unit 52 performs character recognition on the check/correction image received from the check/correction image creation unit 56 using a recognition area and a recognition method defined by the template image 16. The recognition area is given by the coordinate transformation unit 54 as character frame coordinates. The recognition unit 52 outputs a result (text data) of recognition and the character frame coordinates to the display unit 58.

The display unit 58 corresponds to the check screen 18 illustrated in FIG. 1 and displays the result of recognition and the character frame coordinates received from the recognition unit 52 and the check/correction image received from the check/correction image creation unit 56.

Although the recognition unit 52 outputs the character frame coordinates to the display unit 58 in the present modification, the coordinate transformation unit 54 may output the character frame coordinates to the display unit 58, instead.

Second Modification

Although the aligned input image 10 and the template image 16 are overlapped with each other and a circumscribed rectangle of the overlapped images is set as a check/correction image in the present exemplary embodiment, an area having any shape including the aligned input image 10 and the template image 16 may be set as a check/correction image, or a rectangular area including the aligned input image 10 and the template image 16 may be set as a check/correction image, instead.

Figure 13:
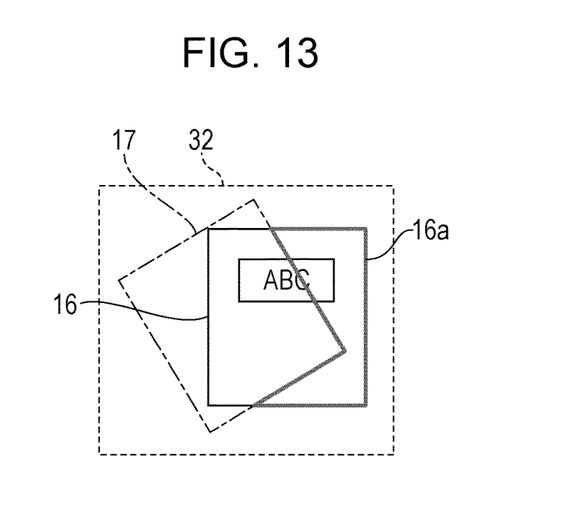
FIG. 13 is a diagram illustrating a rectangle according to the modification.

FIG. 13 illustrates an example of the check/correction image in this case. A rectangular area 32 includes a result of transformation of the input image 10 and the template image 16. The rectangular area 32 is set as a check/correction image. It is to be noted that, unlike in FIG. 6, the rectangular area 32 is not circumscribed on the input image 10 and the template image 16.

In this case, too, the part 16*a* may be displayed in a certain manner in order to emphasize that the part 16*a* is a part of the template image 16 as illustrated in FIG. 7. For example, the part 16*a* may be displayed in pale gray or pale blue.

The user may be enabled to select one of the following:
  (1) An area having any shape including an aligned input image 10 and a template image 16
  (2) A rectangular area including an aligned input image 10 and a template image 16
  (3) A circumscribed rectangular area of an aligned input image 10 and a template image 16

Furthermore, (3) may be used in a default state, and the user may be enabled to select (1) or (2) as necessary.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a receiver that receives an input image to be recognized; and
   a processor configured to, by executing a program,
      align the input image with a template image in such a way as to match a recognition area of the input image and a recognition area defined on the template image,
      perform a process for recognizing the recognition area of the aligned input image,
      generate a check image that comprises both the template image and the aligned input image, and
      display both the check image and a result of the process for recognizing the recognition area of the aligned input image at the same time on a same interface such that a correspondence between the check image and the result is recognizable.

2. The information processing apparatus according to claim 1,
   wherein the processor is configured to generate a rectangular image as the check image.

3. The information processing apparatus according to claim 2,
   wherein the processor is configured to generate, as the check image, a circumscribed rectangular image of the template image and the aligned input image.

4. The information processing apparatus according to claim 3,
   wherein the processor is configured to add, in the check image, information indicating the template image in an area of the circumscribed rectangular image in which the aligned input image does not exist and only the template image exists.

5. The information processing apparatus according to claim 4,
   wherein the processor is configured to include, in the check image, information that exists on the aligned input image but that does not exist on the template image and output the check image.

6. The information processing apparatus according to claim 4,
   wherein the template image defines the recognition area of the input image and characters to be recognized.

7. The information processing apparatus according to claim 4,
   wherein the input image is an image obtained by scanning a skewed document.

8. The information processing apparatus according to claim 3,
   wherein the processor is configured to include, in the check image, information that exists on the aligned input image but that does not exist on the template image and output the check image.

9. The information processing apparatus according to claim 3,
   wherein the template image defines the recognition area of the input image and characters to be recognized.

10. The information processing apparatus according to claim 3,
  wherein the input image is an image obtained by scanning a skewed document.

11. The information processing apparatus according to claim 10,
  wherein the document is a form.

12. The information processing apparatus according to claim 2,
  wherein the processor is configured to include, in the check image, information that exists on the aligned input image but that does not exist on the template image and output the check image.

13. The information processing apparatus according to claim 2,
  wherein the template image defines the recognition area of the input image and characters to be recognized.

14. The information processing apparatus according to claim 2,
  wherein the input image is an image obtained by scanning a skewed document.

15. The information processing apparatus according to claim 14,
  wherein the document is a form.

16. The information processing apparatus according to claim 1,
  wherein the processor is configured to include, in the check image, information that exists on the aligned input image but that does not exist on the template image and output the check image.

17. The information processing apparatus according to claim 1,
  wherein the template image defines the recognition area of the input image and characters to be recognized.

18. The information processing apparatus according to claim 1,
  wherein the input image is an image obtained by scanning a skewed document.

19. The information processing apparatus according to claim 18,
  wherein the document is a form.

20. A non-transitory computer readable medium storing a program causing a computer to execute a process comprising:
  aligning an input image with a template image in such a way as to match a recognition area of the input image and a recognition area defined on the template image;
  performing a process for recognizing the recognition area of the aligned input image;
  generating a check image that comprises both the template image and the aligned input image; and
  displaying both the check image and a result of the process for recognizing the recognition area of the aligned input image at the same time on a same interface such that a correspondence between the check image and the result is recognizable.

* * * * *